United States Patent [19]
Davis et al.

[11] Patent Number: 5,863,515
[45] Date of Patent: Jan. 26, 1999

[54] MESOPOROUS ALUMINA AND PROCESS FOR ITS PREPARATION

[75] Inventors: Mark E. Davis, Pasadena, Calif.; Frederic J. P. Vaudry, Martigues, France

[73] Assignee: California Institute of Technology, Pasadena, Calif.

[21] Appl. No.: 624,336

[22] Filed: Apr. 3, 1996

Related U.S. Application Data

[60] Provisional application No. 60/011,921 Feb. 20, 1996.
[51] Int. Cl.$^6$ ...................................................... C01F 7/02
[52] U.S. Cl. ........................................... 423/628; 423/630
[58] Field of Search ................................... 423/626, 628, 423/630

[56] References Cited

U.S. PATENT DOCUMENTS

| | | | |
|---|---|---|---|
| 3,207,578 | 9/1965 | Brown | 423/626 |
| 3,429,660 | 2/1969 | Keith | 423/626 |
| 3,979,509 | 9/1976 | Royer | 423/626 |
| 4,179,411 | 12/1979 | Broersma | 423/626 |
| 5,019,367 | 5/1991 | Oguri | 423/626 |
| 5,057,296 | 10/1991 | Beck | 423/306 |
| 5,112,676 | 5/1992 | Cot | 423/592 |
| 5,198,203 | 3/1993 | Kresge et al. | 423/718 |
| 5,455,019 | 10/1995 | Invi | 423/625 |
| 5,622,684 | 4/1997 | Pinnavaia et al. | 423/702 |

FOREIGN PATENT DOCUMENTS

| 2349972 | 6/1974 | Germany | 423/630 |
|---|---|---|---|

OTHER PUBLICATIONS

P.T. Tanev et al., "A Neutral Templating Route to Mesoporous Molecular Sieves", Science, vol. 267, Feb. 10, 1995, pp. 865–867.

P.T. Tanev et al., "Titanium–Containing Mesoporous Molecular Sieves for Catalytic Oxidation of Aromatic Compounds", Nature, vol. 368, Mar. 24, 1994, pp. 321–323.

S.A. Bagshaw et al., "Templating of Mesoporous Molecular Sieves by Nonionic Polyethylene Oxide Surfactants", Science, vol. 269, Sep. 1, 1995, pp. 1242–1244.

Q. Huo et al., "Organization of Organic Molecules with Inorganic Molecular Species into Nanocomposite Biphase Arrays", Chem. Mater. 1994, 6, 1176–1191.

C.C. Landry et al., "From Minerals to Materials: Synthesis of Alumoxanes from the Reaction of Boehmite with Carboxylic Acids", J. Mater. Chem., 1995, 5(2), 331–341.

D.M. Antonelli et al., "Synthesis of a Stable Hexagonally Packed Mesoporous Niobium Oxide Molecular Sieve Through a Novel Ligand–Assisted Templating Mechanism", Angew. Chem. Int. Ed. Engl. Mar. 1996, 35, No. 4, pp. 426–430.

*Primary Examiner*—Steven Bos
*Assistant Examiner*—Peter DiMauro
*Attorney, Agent, or Firm*—Richard P. Fennelly; Louis A. Morris

[57] ABSTRACT

Mesoporous, alumina compositions having an average pore diameter substantially ranging from about 15 Å to about 40 Å and an average surface area of no less than about 500 meter square/gram are disclosed. These materials can be formed by treating an aluminum source that is derived from an aluminum alkoxide in an organic-aqueous solution with an organic structured directing agent to form meso-sized micelles followed by calcination of the resulting composition. Appropriate organic structural directing agents are alkyl carboxylic acids.

5 Claims, 14 Drawing Sheets

MESOPOROUS ALUMINA AND PROCESS FOR ITS PREPARATION

This application claims the benefit of U.S. Provisional Application No. 60/011,921, filed Feb. 20, 1996.

BACKGROUND OF THE INVENTION

Activated aluminas are attractive catalysts for processes such as petroleum hydrodesulfurization, isomerization reactions, the Claus reaction, the dehydrogenation of butane to give butenes and the dehydration of alcohols to give alkenes. One of the major problems related to the use of alumina catalysts is the deactivation by coke formation and pore plugging which limits the diffusion of substrates and products in and out the catalyst particles. It is known that the larger the contribution of micropores to the specific surface area and the wider the pore size distribution, the greater the enhancement in the deactivation rate. Thus, synthesis of aluminas with porosity properties comparable to those exhibited by high and all-silica mesoporous materials would be of industrial interest. The silica-based mesoporous materials developed by researchers at Mobil, e.g., M41S, were recently prepared by organizing silica with organic surfactants (See C. T. Kresge et al., Nature 1992, 359, 710–712 and J. S. Beck et al., J. Am. Chem. Soc. 1992, 114, 10834–10843). These materials can exhibit cubic or hexagonal symmetry, e.g., MCM-48 and MCM-41, respectively. Thermal decomposition of the surfactant allows for the development of narrow pore size distributions in the range 15–100 Å and BET specific surface areas above 1000 $m^2/g$. Mesoporous materials are not restricted to silica since the MCM-41 type materials have been reported recently for oxides of titanium (See D. M. Antonelli et al., Angew. Chem. Int. Ed. Eng. 1995, 34, No. 18, 2014–2017), antimony, and lead (See Q. Huo et al., Nature 1994, 368, 317–321 and Q. Huo et al., Science 1995, 269, 1242–1244). Our own early work on pure-alumina mesoporous materials revealed that aqueous solutions of cationic surfactants do not yield mesophases and, as already reported in the literature (Q. Huo et al., Science 1995, 269, 1242–1244), that aqueous solutions of anionic surfactants, such as alkyl phosphates or sodium dodecylbenzenesulfonate, can promote the formation of thermally unstable lamellar phases as the only mesophases.

It is also known to synthesize mesoporous crystalline materials containing such oxide materials as silica and alumina (see, for example, U.S. Pat. Nos. 5,057,296 to J. S. Beck and 5,198,203 to C. T. Kresge et al.) More recently, layered, non-porous aluminas have been synthesized using anionic surfactants (see, for example, Nature, Vol. 368, Mar. 24, 1994, pp. 317–321 and Chemistry of Materials, 1994, Vol. 6, pp. 1176–1191).

In addition to the foregoing prior art disclosures, certain other disclosures exist in the art showing alumina-containing, relatively large macroporous structures with an average pore diameter of over 100 Å. Examples such disclosures may be found, for example, in European Patent Publication Nos. 363,910 and 365,801.

Recently, the synthesis of all-alumina mesoporous materials has been mentioned by S. A. Bagshaw et al, Science, Vol. 269, Sep. 1, 1995, pp. 1242–1244. The procedure, which is not given in detail in that publication, involves the use of polyglycols as surfactants. The solids after calcination at 873 K can develop a material having a BET specific surface area of 420 $m^2/g$ and a pore diameter of 48 Å.

SUMMARY OF THE INVENTION

An objective of the present invention is to synthesize aluminas with high surface areas and narrow pore size distributions that do not contain micropores. Most of the aluminas used for catalytic applications are prepared by precipitation, drying and calcination of aluminum (oxo) hydroxides. The pseudoboehmite "CATAPAL alumina" is among the best catalyst base materials supplied on the market because it can be obtained essentially free from impurities such as sodium. This pseudoboehmite is synthesized as a by-product of the manufacture of linear $C_2$–$C_{20}$ alcohols, and the process involves the hydrolysis of the corresponding aluminum alkoxides in organic solvents using controlled amounts of water as described by C. Misra, Industrial Alumina Chemicals, ACS Monograph 184, Washington, D.C. 1986 (Ziegler process). Here we describe a variation of this process where an organic surfactant and an aluminum alkoxide are reacted with controlled amounts of water in organic solvents for the preparation of activated aluminas with unique porosity properties, e.g., specific surface areas as high as 710 $m^2/g$ and narrow pore size distributions centered around 20–25 Å.

The present invention, therefore relates to a novel mesoporous alumina composition, which may be substantially pure, having a average pore volume, for example, which substantially ranges from about 15 Å to about 40 Å, preferably from about 20 Å to about 30 Å. There are substantially no pores having a diameter above about 50 Å, nor are there micropores below about 15 Å. The alumina product of the present invention preferably also has an average surface area of no less than about 500 $m^2/gm$.

The process for forming these mesoporous, substantially pure alumina compositions comprises treating an aluminum source, which can, for example, be derived from aluminum alkoxide, in an organic or organic-aqueous solution, with an appropriate organic structure directing agent for forming the desired meso-sized micelles of the foregoing pore size ranges, and then hydrothermally treating the resulting composition so that the mesoporosity is maintained in that general range.

In accordance with the broadest articulation of the present invention, various anionic surfactants, polar or apolar solvent, and organoaluminum or aluminum salts can be used to form the desired alumina mesophases. The following Table provides representative examples.

| surfactants | solvent S | aluminum source, A | composition of the synthesis mixture | synth. temp. (K.) | synth time (d) | XRD d (Å) |
|---|---|---|---|---|---|---|
| lauric acid | 2-propanol | acetylacetonate | A:1.00s:3w:30S | 355 | 8[f] | 30 |
| lauric acid | chloroform | secbutoxide | A:0.24s:3w:6S | 343 | 3.5 | e |
| lauric acid | ethyl-acetate | secbutoxide | A:0.30s:3w:17S | 355 | 1.5[f] | 41 |
| lauric acid | diethyl-ether | secbutoxide | A:0.31s:3w:20S | 298 | 2.5[f] | 39 |
| lauric acid | pentane | secbutoxide | A:0.32s:3w:15S | 298 | 3.5[f] | 43 |
| DBS[a] | pentane | secbutoxide | A:0.17s:3w:18S | 298 | 3[f] | 38 |

| surfactant s | solvent S | aluminum source, A | composition of the synthesis mixture | synth. temp. (K.) | synth time (d) | XRD d (Å) |
|---|---|---|---|---|---|---|
| DBS | formamide | Chlorhydrol[b] | A:0.14s:14S | 383 | 1 | 35 |
| lauryl phosphate | 1-propanol | nitrate[c] | A:0.28s:27S | 383 | 4.5 | 29 |
| lauryl phosphate | 1-propanol | secbutoxide | A:0.20s:3w:32S | 355 | 4 | 32 |

[a]Sodium dodecylbenzenesulfonate.
[b]Chlorhydrol is the Aluminum Keggin ion in its chloride form: $Al_{13}O_4(OH)_{24}(H_2O)_{12}Cl_7$.
[c]Nonahydrate.
[d]"A" denotes one equivalent of aluminum, and "w" is for water.
[e]A gel was recovered.
[f]A shorter synthesis time didn't allow for the formation of alumina mesophases.

Solvent such as diethylether or pentane allowed for formation of alumina mesophases which resembled those obtained in alcohols at room temperature, using a lauric acid/aluminum sec-butoxide combination. The high d-spacing XRD line of aluminas synthesized in pentane appeared after only 3.5 days, whereas the definitive TGA curve was already obtained after twenty hours. Alumina mesophases could also be obtained using sodium dodecylbenzene-sulfonate as the anionic surfactant in formamide when treated at 383 K for ten days. Aluminum acetylacetonate was successfully employed when heated for eight days at 355 K.

DESCRIPTION OF THE DRAWINGS

The present invention is further understood by reference to the Drawings which form a part of the present specification wherein:

FIG. 1-2 is the TGA curve for the dried sample from Example 1;

FIG. 1-3 is the XRD pattern showing the shift to higher d-spacings after calcination for the product made in Example 1;

FIG. 1-4 illustrates the XRD pattern for the material synthesized in Example 1 after calcination at higher temperatures (873 K);

FIG. 2-1 are the XRD patterns of the as-made material and of the calcined material made in accordance with Example 2;

FIG. 2-2 is the XRD pattern for the material made in Example 2 after calcination at 773 K;

FIGS. 3-1 to 7-1 are the XRD patterns, respectively, for the materials described in Examples 3–7, respectively;

DESCRIPTION OF PREFERRED EMBODIMENTS

Figure 1:
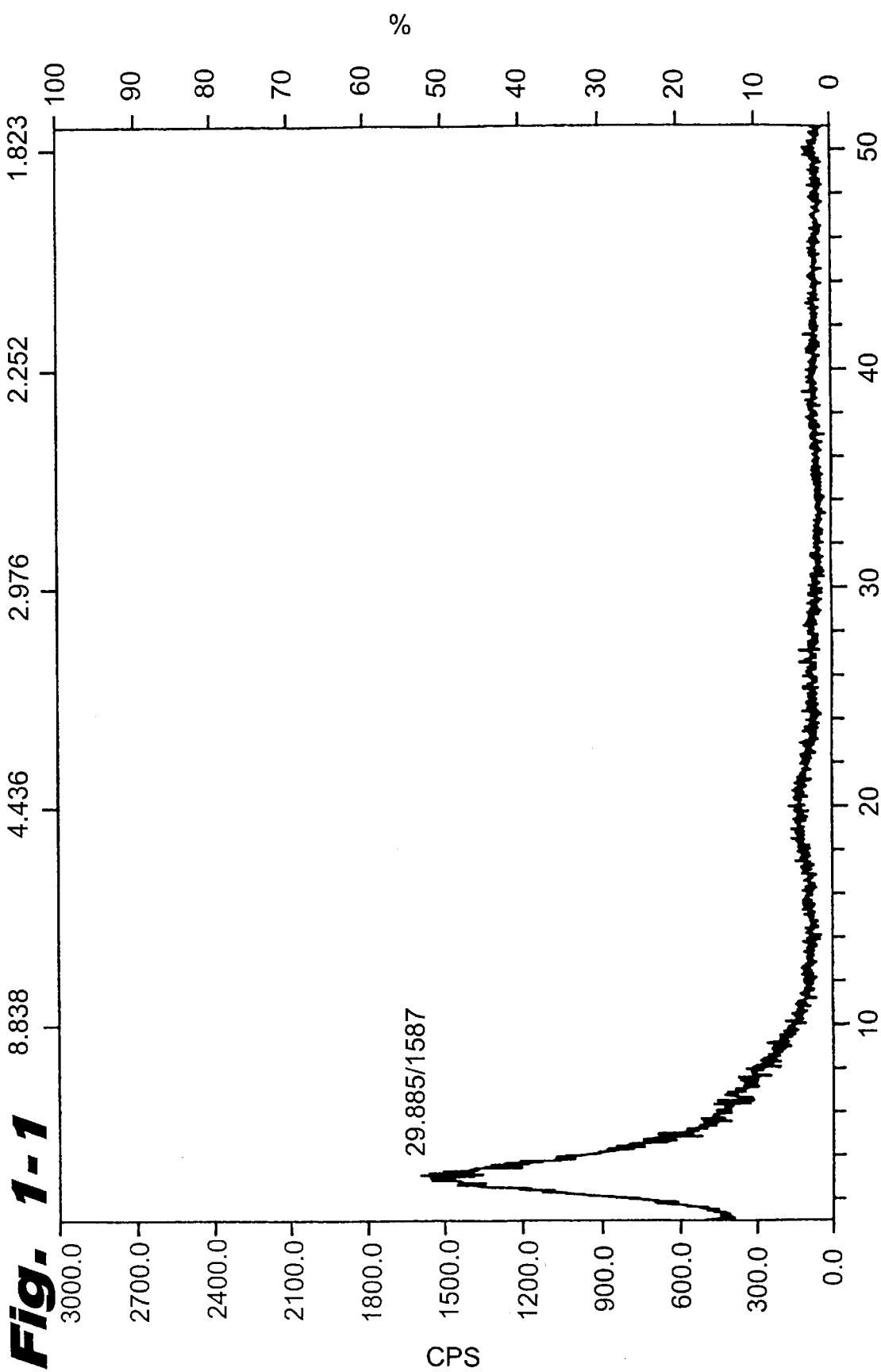
FIG. 1-1 is the XRD pattern for the dried, as-made sample from Example 1.

As mentioned before, the product of the present invention is appropriately formed using an aluminum source which is preferably derived from an appropriate aluminum alkoxide which is capable of sol-gel reaction to form the desired alumina composition. As used herein, the term "aluminum alkoxide" also refers to aluminum acetylacetonate compositions which are capable of similar sol-gel reaction. Generally speaking, the selected aluminum alkoxide should have an alkyl group which contains from about 1 to about 6 carbon atoms therein. Representative alkoxides of this type including aluminum sec-butoxide, aluminum isopropoxide, and the like.

The appropriate aluminum alkoxide reagent for use herein is placed in a aqueous-organic solvent medium for hydrolysis of the alkoxide to the desired alumina via sol-gel reaction. The organic component of this mixed water-organic medium is preferably an alcohol which exhibits an acceptable degree of miscibility with both the water and the aluminum precursor that is selected. Generally speaking, alkyl group-containing straight or branched alcohols which contain up to about nine carbon atoms, may be used with representative examples including ethanol, propanol, isopropanol, hexanol, and nonanol. As the alcohol which is used increases in molecular weight, their boiling point increases thereby allowing for the use of higher synthesis temperatures.

While it is possible to synthesize substantially pure alumina materials by use of the present invention, it is also within the contemplation of the invention to insert other functional atomic species such as phosphorus, sulfur and tungsten atoms in order to make solid acid catalyst materials. For example, use of sodium dodecylbenzenesulfonate as a surfactant will provide sulfur, whereas use of lauryl phosphate as the surfactant will provide phosphorus.

The hydrolysis of the aforementioned reagents in the mixed-organic solvent medium, takes place in the presence of an appropriate organic structure directing agent which is capable of forming meso-sized micelles that are bounded by the hydrolyzing aluminum alkoxide source in the recited type of solvent medium. Appropriate organic structure directing agents for use with the present invention include the normal or branched alkyl carboxylic acids, such as those containing from about 3 to about 20 carbon atoms in the alkyl group contained therein, for example from propionic to stearic acid. Representative examples of such acids include those containing 6, 8, 12, or 18 carbon atoms in the alkyl group, for example.

The synthesis mixture for producing the claimed mesoporous alumina is allowed to stand for an appropriate length of time and temperature to allow the sol-gel reaction to proceed and reach the desired degree of completion, for example, from about two days to about twelve days. The solids that are desired herein can be formed at room temperature. However, the synthesis mixture can also be heated because of the general trend observed for the MCM-41 silicates where an increase in the synthesis temperature improved the thermal stability of the materials at least until demicellization of the surfactant occurred. Higher synthesis temperatures can be carried out in higher bailing point alcohols. It is preferred to obtain solids below the gelation temperature of the system. For example, an aluminum hydroxide suspension obtained at 298 K in either 1-hexanol or 1-nonanol coagulated to a gel when heated at 423 K and 473 K, respectively. If 1-propanol is used as the solvent, the gelation temperature lies between 411 K and 423 K. The solid material prepared using the lauric acid/1-propanol system and heated for two days at 411 K was the most thermally stable and showed an XRD line at high d-spacings after heating under air up to 873 K. Synthesis in 2-butanol, however, produced a material where the high d-spacing was not present for solids recovered after eight days at 423 K. This allows for the hydrolysis of the aluminum precursor in the recited type of solvent on the periphery of the meso-sized micelles that are formed in the liquid solution by the relatively long chain organic structure directing agent. Upon completion of the hydrolysis reaction, the resulting alumina structure can then be easily recovered by filtration, and the product can be washed with appropriate solvent, such as denatured alcohol, and can then be dried to yield the desired intermediate, calcinable mesoporous alumina product.

The preferred aluminum alkoxide/alcohol/carboxylic acid system has been found to be capable of yielding alumina mesophases over a wide variety of conditions. Aging and hydrolysis times (which can respectively range from about 0.1 hour to about 42 hours and from about 0.05 hours to about 18 hours) were found to have little effect on the formation of the alumina mesophases. Also, alkyl chain branching for the chosen surfactant does not significantly affect the position of the XRD line measuring the porosity of the system. The ability of carboxylate bidentate ligands to coordinate with one or two aluminum ions is believed to allow for rapid formation of alumina mesophases from syntheses mixtures featuring a variety of carboxylic acid-to-aluminum ratios.

The previously described calcinable mesoporous alumina product is then calcined under conditions which substantially retain the desired pore diameter of the intermediate material for the final calcined product. Calcination, as contracted to the use of either ion exchange or extraction procedures, allows for development of the desired mesoporosity in the final calcined product.

Figure 12:
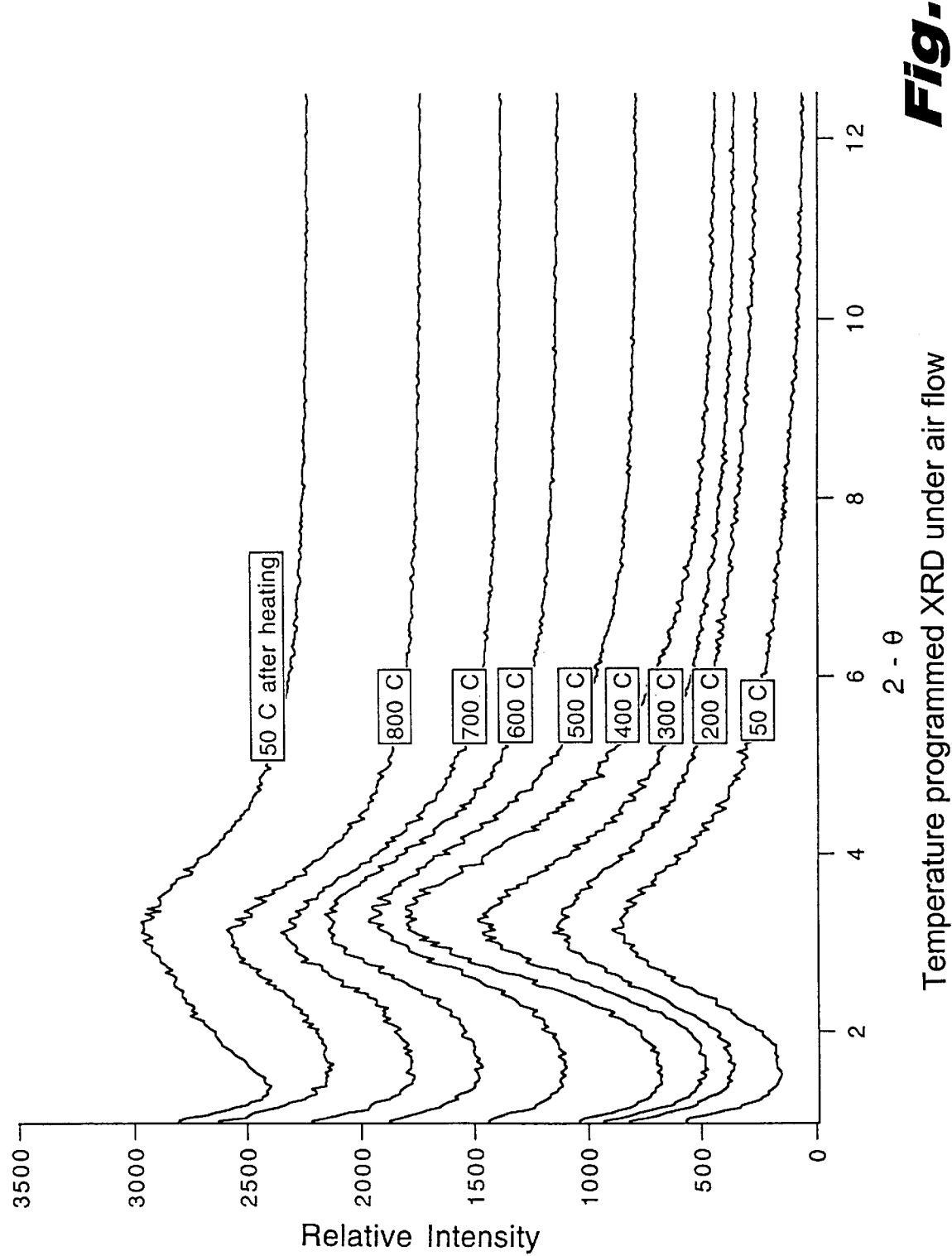
FIG. 12 illustrates the temperature programmed XRD data under air flow using a preferred calcination procedure.

The maximum calcination temperature is very much dependent upon the configuration of the sample during heating. This phenomenon is common, as is well known to the person of ordinary skill in the art, with structured oxide materials In other words, in a thick bed of sample it is observed that water loss from one region significantly can alter another portion of the sample. Thus, shallow bed configurations normally yield the desired In Examples 1–2 which follow in which calcination was performed, a relatively thick bed (for example, in excess of about 1 cm) was used, and the porosity of the material was destroyed above certain calcination temperatures. In contrast a relatively thinner bed (for example, on the order of about a few millimeters) of the as-synthesized material from Example 1 was placed in an in-situ cell in an X-ray diffractometer. Then, 500 ml/minute of air was passed over the sample while it was heated to the temperatures indicated in FIG. 12. It should be noted that by use of this calcination procedure with the thinner bed of material, the calcined material still possessed a high d-spacing at a calcination temperature of 800° C.

The full decomposition of organics in the structure is obtained at lower calcination temperatures when the alumina mesophases are synthesized at lower temperatures. Water readsorption at room temperature on calcined aluminas further shifts the XRD line to higher d-spacings with the line disappearing after twenty to thirty minutes of rehydration. The calcination of such rehydrated aluminas yields solids that do not show an XRD line at high d-spacings.

The mesoporous alumina product that is formed by the previously described process is substantially pure in regard to its alumina content and is mesoporous, i.e. having an average pore diameter which substantially ranges from about 15 Å to about 40 Å, preferably from about 20 Å to about 30 Å. The pore diameters are not influenced by variation of the surfactant when a carboxylic acid surfactant is employed. The material has substantially no pores with a diameter above about 50 Å, nor are there micropores below about 15 Å. Its surface area is quite high, preferably over about 500 m$^2$/gm and up to about 700 m$^2$/gm for those made with lauric or stearic acid, for example. The specific surface area is lower for aluminas synthesized using lower molecular weight carboxylic acids as surfactants.

The aforementioned mesoporous alumina product can be used as previously described: for petroleum hydrodesulfurization; in the Claus reaction; for the dehydrogenation of butane to give butenes; and in the dehydration of alcohols to give alkenes.

The present invention will be further understood by the Examples.

General Experimental Procedures

Chemicals

Formamide, ethanol, 2-propanol, diethylether, ethylacetate and pentane were purchased from EM Science; 2-butanol from Fischer; chloroform from Mallinckrodt and 1-propanol, 1-hexanol, 1-nonanol from Aldrich. The aluminum-containing reactants and the surfactants were purchased from Aldrich, except for neodecanoic acid (Pfaltz and Bauer), lauryl phosphate (Lancaster) and the chloride form of the aluminum Keggin ion (Reheis Inc.).

Synthesis in Alcohols

Solids denoted as "solids JAX" were prepared in 1-propanol (alcohol solvent denoted by subscripted "A") at a temperature "x" (in Kelvin) using a carboxylic acid "J". The composition of the synthesis mixture was as follows: Al(OCH(CH$_3$)C$_2$H$_5$)$_3$:3.2 H$_2$0:0.30 C$_n$H$_{2n+1}$CO$_2$H:26 C$_2$H$_5$CH$_2$OH. J is either caproic acid (n=5; J=C), lauric acid (n=11; J=L) or stearic acid (n=17; J=S). As an example, the synthesis procedure for L$_{A383}$ is given below:

An aluminum hydroxide suspension was obtained by hydrolysis of 43.8 g of aluminum sec-butoxide with 10.3 g of deionized water in 275 g of 1-propanol (99+%). After sixty minutes of stirring, 10.8 g of lauric acid (99.5+%) was added. The mixture was aged for twenty-four hours at room temperature, and was heated under static conditions at 383 K in a one-liter glass jar for two days. The solid was filtered, washed with ethanol and dried at room temperature.

Syntheses in Other Solvents

The organic surfactant was dissolved in the organic solvent. Water and the aluminum-containing reagent were subsequently added. A fifteen hour aging at room temperature preceded the thermal treatment.

A solid denoted as "solid L$_{P298}$" was synthesized in pentane at 298 K using lauric acid, from a mixture of the following composition: Al(OCH(CH$_3$)C$_2$H$_5$)$_3$:3.0 H$_2$0:0.32

$C_{11}H_{23}CO_2H$:20 $(C_2H_5)_2O$. A solid denoted as "solid $L_{E298}$" was synthesized in diethylether at 298 K using lauric acid, from a mixture of the following composition: Al(OCH(CH$_3$)C$_2$H$_5$)$_3$:3.0 H$_2$0:0.31 C$_{11}$H$_{23}$C0$_2$ H:20 C$_2$H$_5$)$_2$O.

Calcination Procedures

The solids were generally calcined for two hours at temperatures ranging from 673 to 873 K with a temperature ramp of 0.5 K/min from room temperature to the calcination temperature. The calcination atmosphere was either air or nitrogen during the ramp and air at the final temperature. The calcined solids were removed from the oven when the temperature was still at 500–600 K and were immediately analyzed by XRD in such a way that the first XRD peak was observed within one minute of the removal from the oven.

Characterization Methods

XRD patterns were recorded on a Scintag XDS 2000 diffractometer using Cu-Kα radiation. The diffracted beam was detected by a liquid nitrogen-cooled germanium solid-state detector. The samples were analyzed in the 2θ range 1°–51° in steps of 0.03°.

TGA patterns were collected on a DuPont 951 thermogravimetric analyzer. The samples were heated in air and the temperature ramp was 1 K/min.

Nitrogen adsorption/desorption experiments were carried out at 77 K on an Omnisorp Coulter 100CX or a Micromeritics ASAP 2010 analyzer. The pore size distributions were calculated using the Barret, Joyner, Hallender method on the desorption branch.

n-Heptane (99%, Aldrich) and neopentane (99%, Wiley) adsorption experiments were performed at 298 K using a McBain-Baker balance. The saturation pressures at 298 K for the two hydrocarbons are 46 and 1306 Torr, respectively. The calcined materials were outgassed at 523 K under vacuum prior to the adsorption experiments.

EXAMPLE 1

This Example depicts a preferred embodiment of the present invention.

Figures 1, 2:
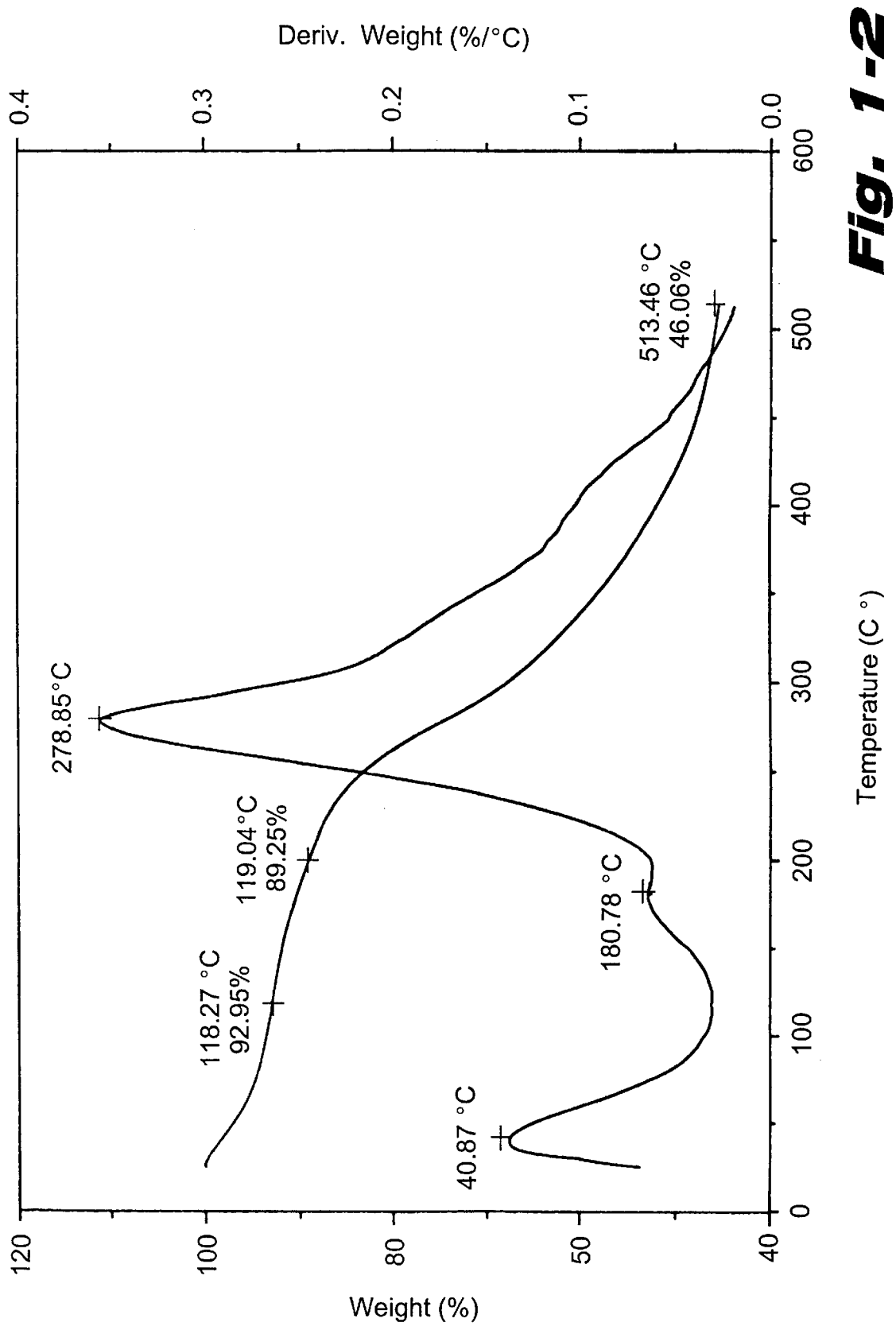
Figures 1, 2, 3:
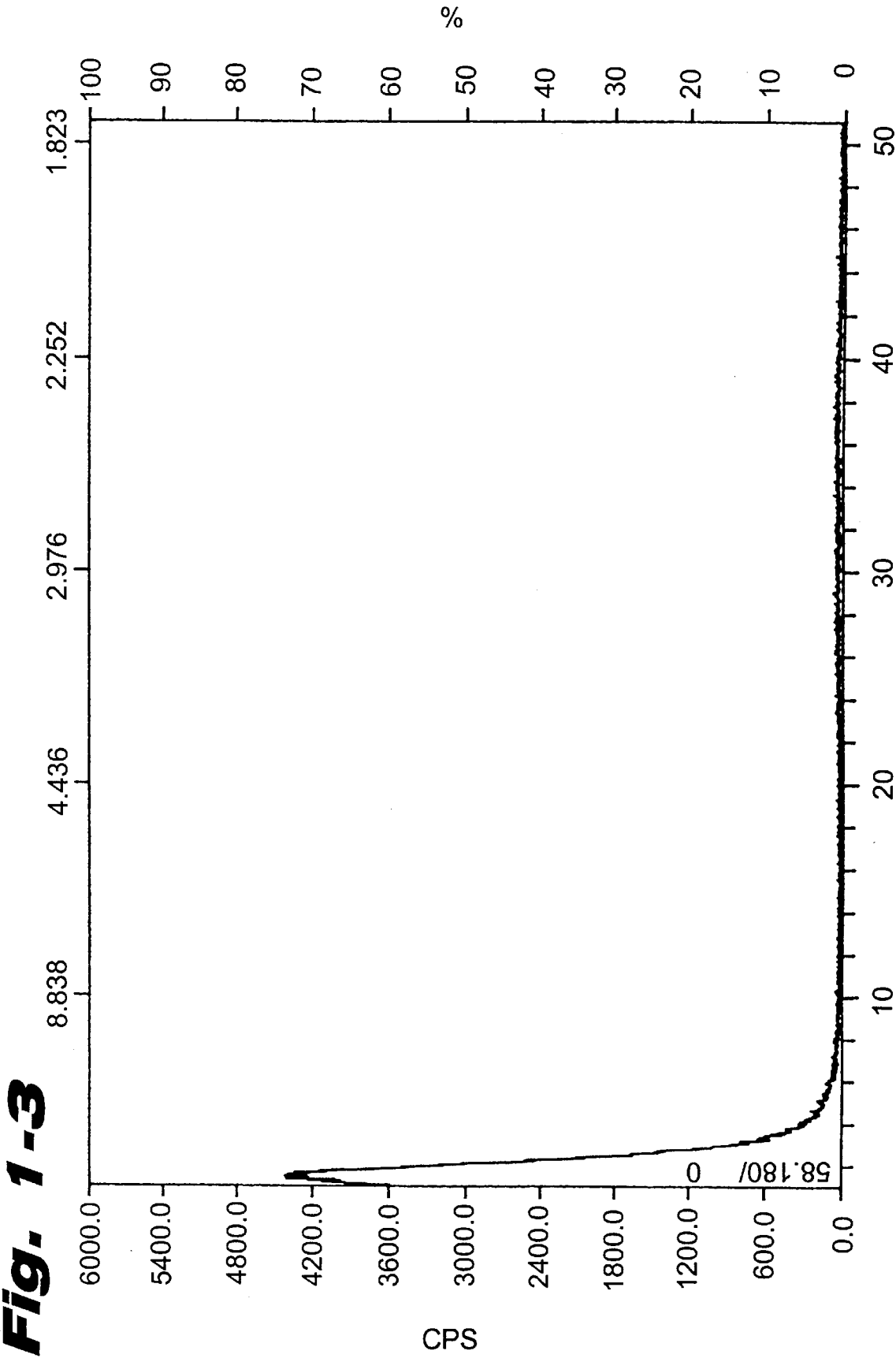

In this Example, 0.73 g of lauric acid (99.5+% from Aldrich) was added to a suspension of aluminum hydroxide obtained after five minute hydrolysis of 2.86 g of aluminum sec-butoxide (97% from Aldrich) by 0.66 g of deionized water in 18.08 g of 1-propanol (99+% from Aldrich). After five minutes of stirring at room temperature, the mixture was tumbled at 411 K for two days in a reactor lined with TEFLON brand fluoropolymer. As in the other Examples, which follow, the solid was recovered by filtration, washed with denatured ethanol, and dried at room temperature. The XRD pattern shown in FIG. 1-1 exhibited a single line corresponding to a 30 Å d-spacing. The TGA curve given in FIG. 1-2 showed a 54% weight loss below 793 K. After calcination at 823 K for ninety minutes (temperature ramp: 0.5 K/min), the line at high d-spacings was shifted to 60 Å (FIG. 1-3). After calcination at 873 K for thirty minutes (temperature ramp: 0.5 K/min), a shift to 70 Å was observed (FIG. 1-4). The pore size remained at about 20–28 Å during these calcination steps. No high d-spacing line was observed for calcination temperatures higher than 873 K.

EXAMPLE 2

In a similar manner to that described in Example 1, 10.8 g of lauric acid was added to a suspension of aluminum sec-butoxide obtained after one hour of hydrolysis of 43.8 g of aluminum sec-butoxide by 10.3 g of water in 275 g of 1-propanol. After twenty-four hours of aging, the synthesis mixture was treated for two days at 373 K in a 1-l glass jar. FIG. 2-1 shows the XRD patterns of the as-made material (d-spacing: 29 Å) and of the material calcined at 693 K for one hour with a temperature ramp of 0.5 K/min (d-spacing: 46 Å). The BET specific surface area, measured by nitrogen adsorption at 77 K, of this calcined material was 570 m$^2$/g. The pore size remained at about 20–25 Å during these calcination steps. After calcination at 773 K for one minute with a temperature ramp of 1 K/min, the XRD line had disappeared (FIG. 2-2) thereby indicating calcination conditions too severe for obtaining the desired calcined material.

In the Examples which follow, uncalcined template-containing as-made mesoporous alumina compositions are shown to illustrate that aspect of the present invention.

COMPARATIVE EXAMPLE 3

In this Example, a synthesis mixture with the same stoichiometry as in Example 2 was aged for fourteen hours and loaded into a reactor lined with TEFLON brand fluoropolymer. The synthesis was carried out at 423 K and did not yield any mesophase after three and one half days (FIG. 3-1) thereby indicating temperature conditions too severe for obtaining the desired calcinable intermediate.

EXAMPLE 4

Figures 1, 2, 3, 4:
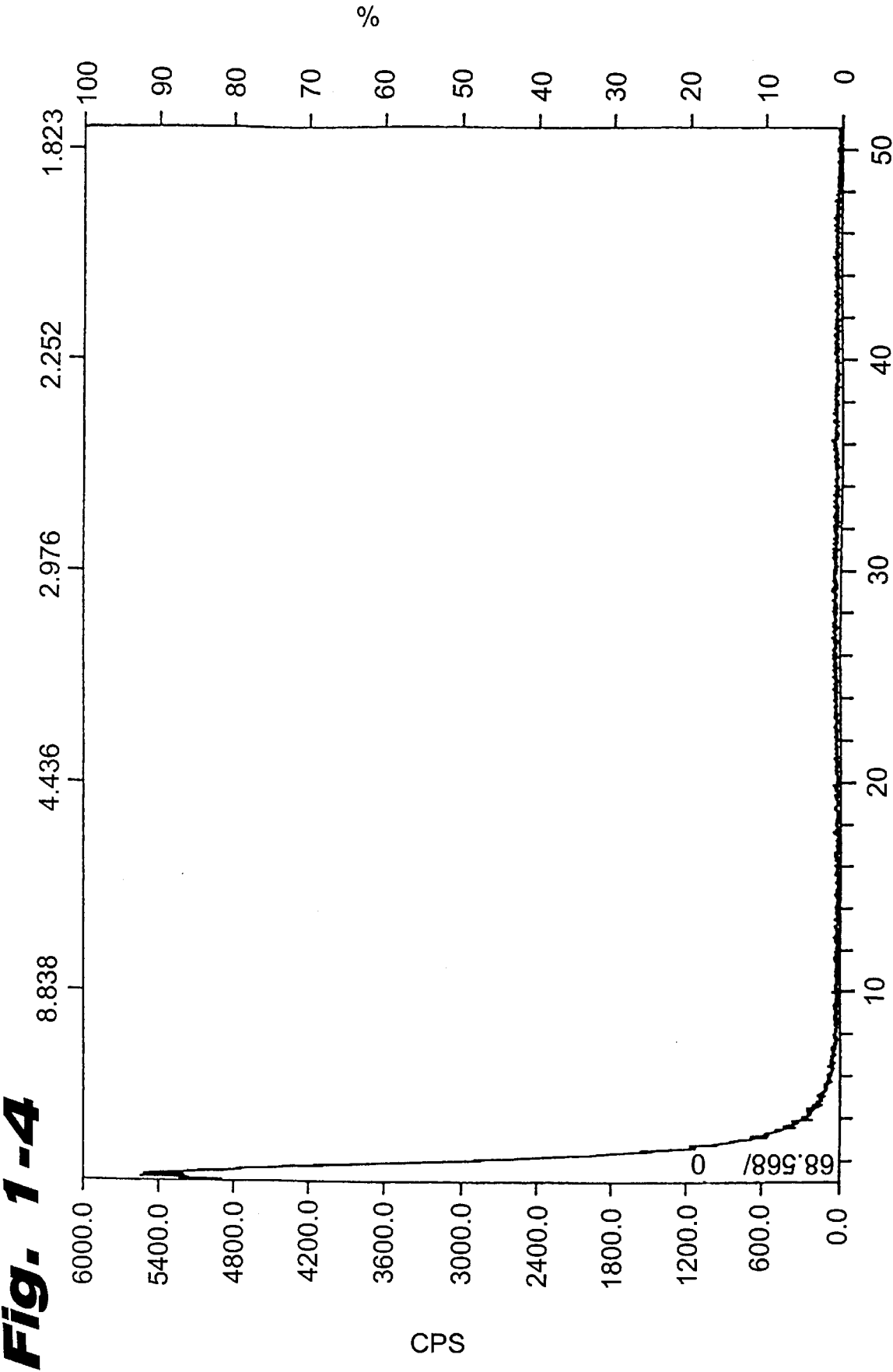
Figures 1, 2:
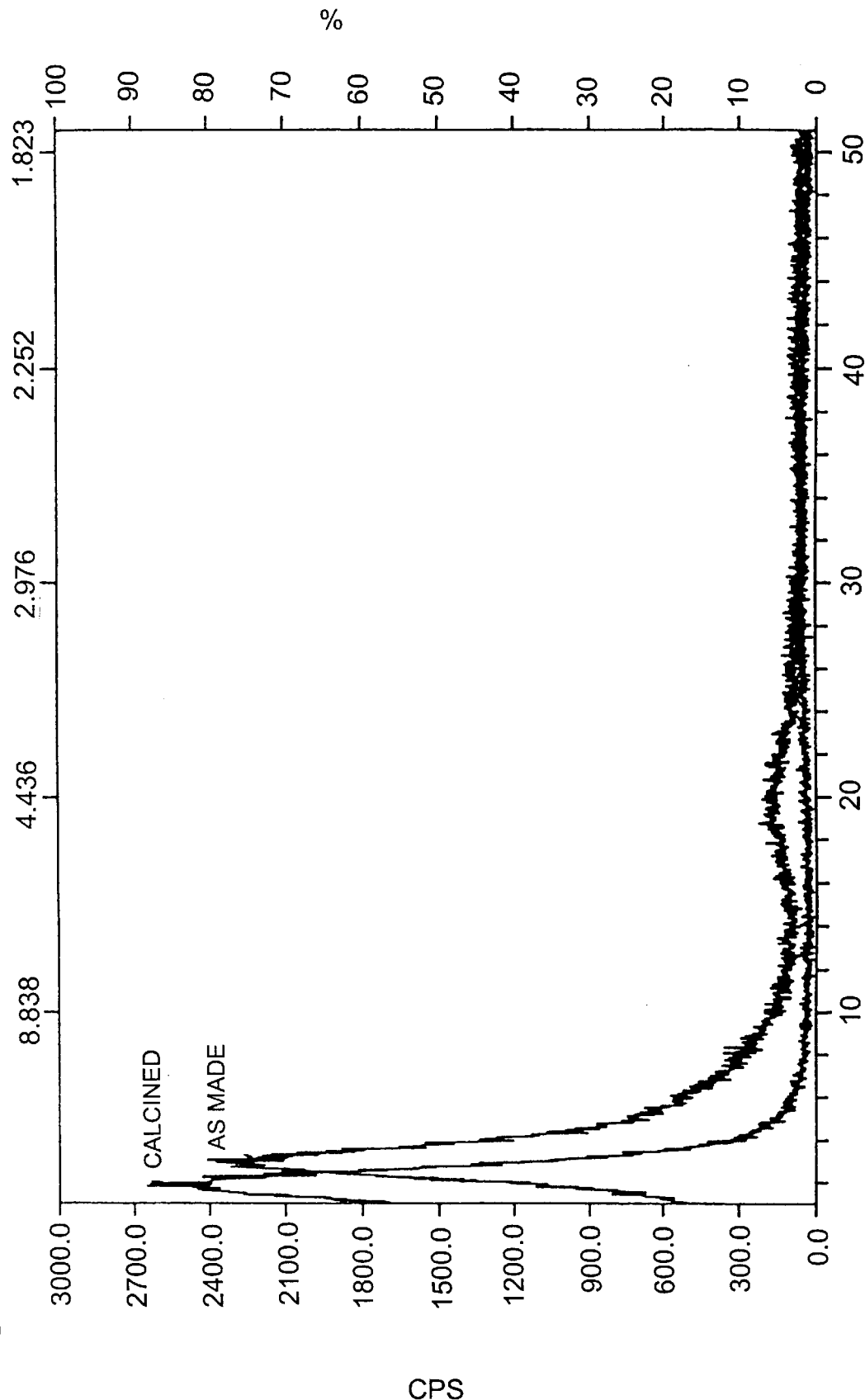
Figure 2:
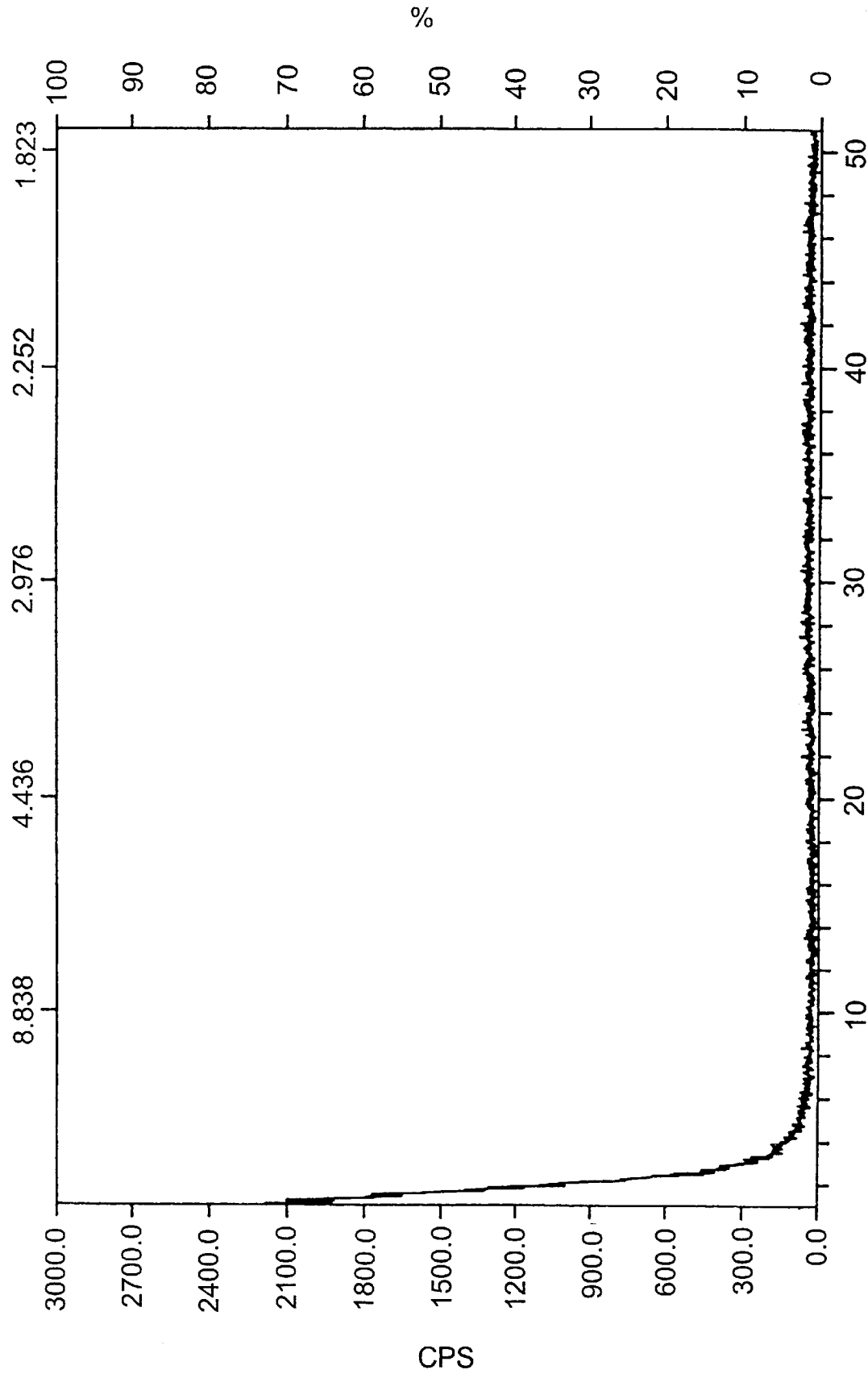
Figures 1, 3:
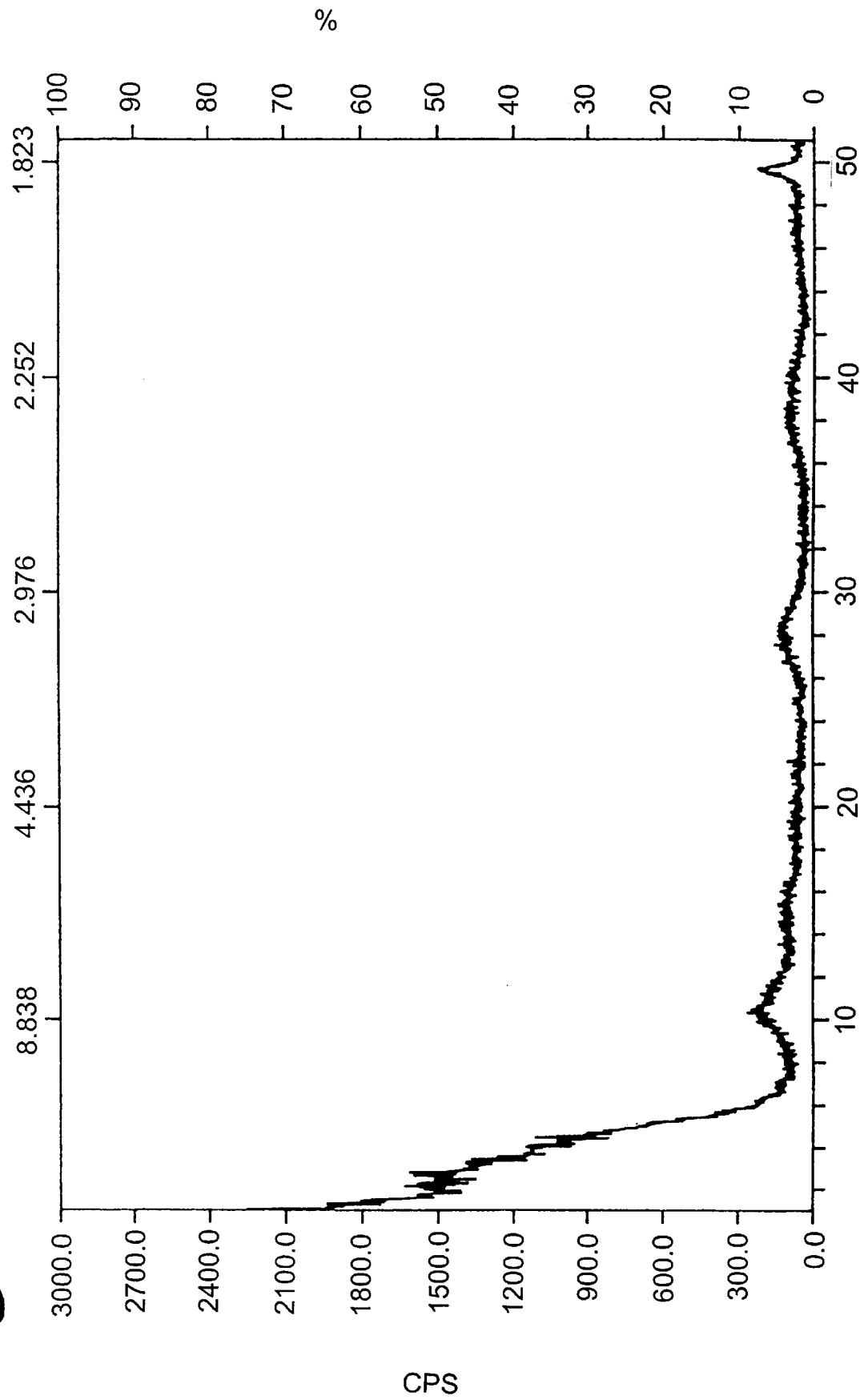
Figures 1, 4:
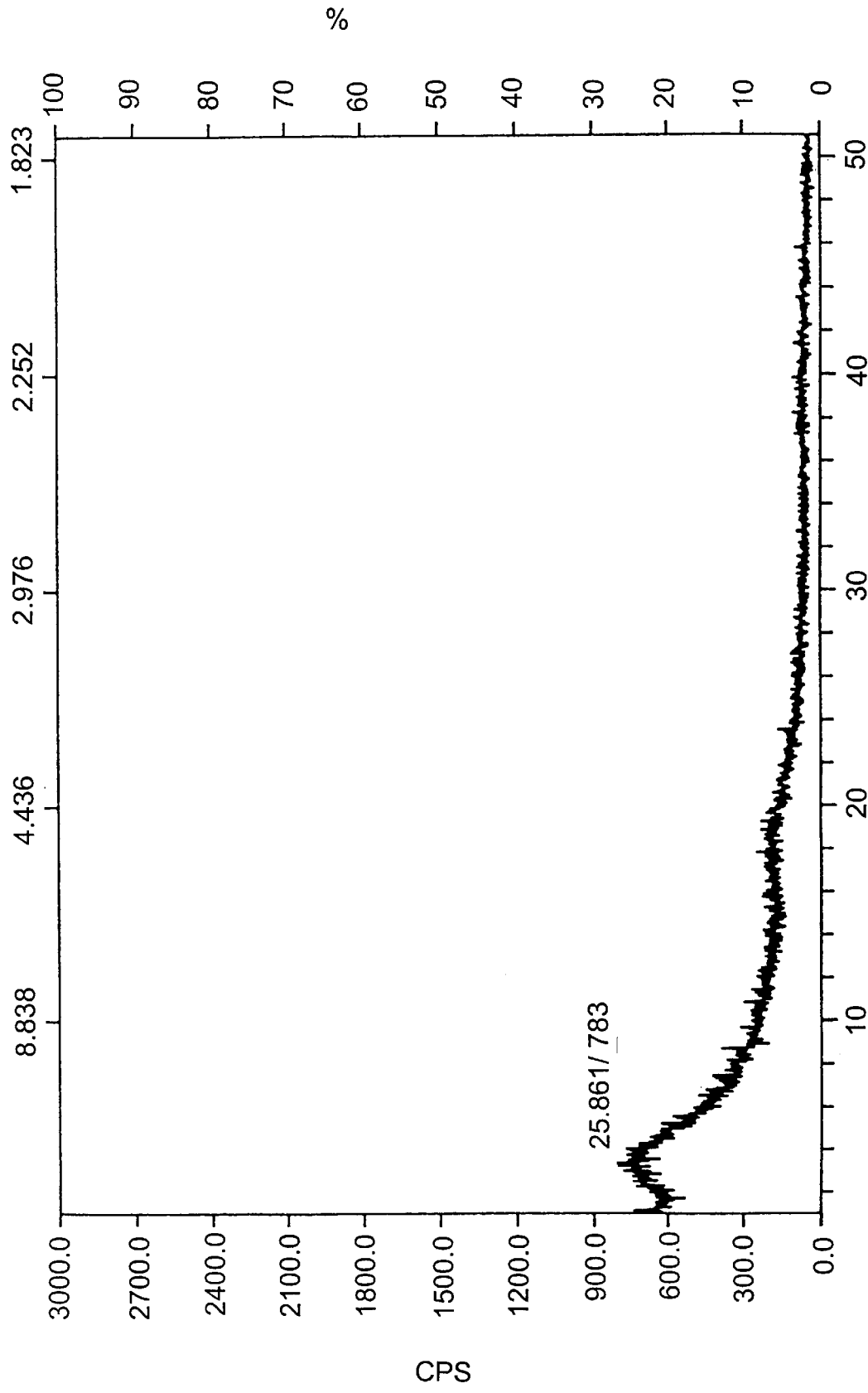

In this Example, which illustrates with Example 5 the effects of aging versus water content, 1.00 g aluminum sec-butoxide was hydrolyzed by 0.22 g of water for forty minutes in 4.77 g methanol (99.8% EM). A solution of 0.30 g lauric acid in 5.00 g of methanol was then added. The synthesis mixture was aged for fourteen hours before thermal treatment at 355 K for five days. The XRD pattern exhibited a line that corresponds to a 26-Å d-spacing (FIG. 4-1).

EXAMPLE 5

Figures 1, 5:
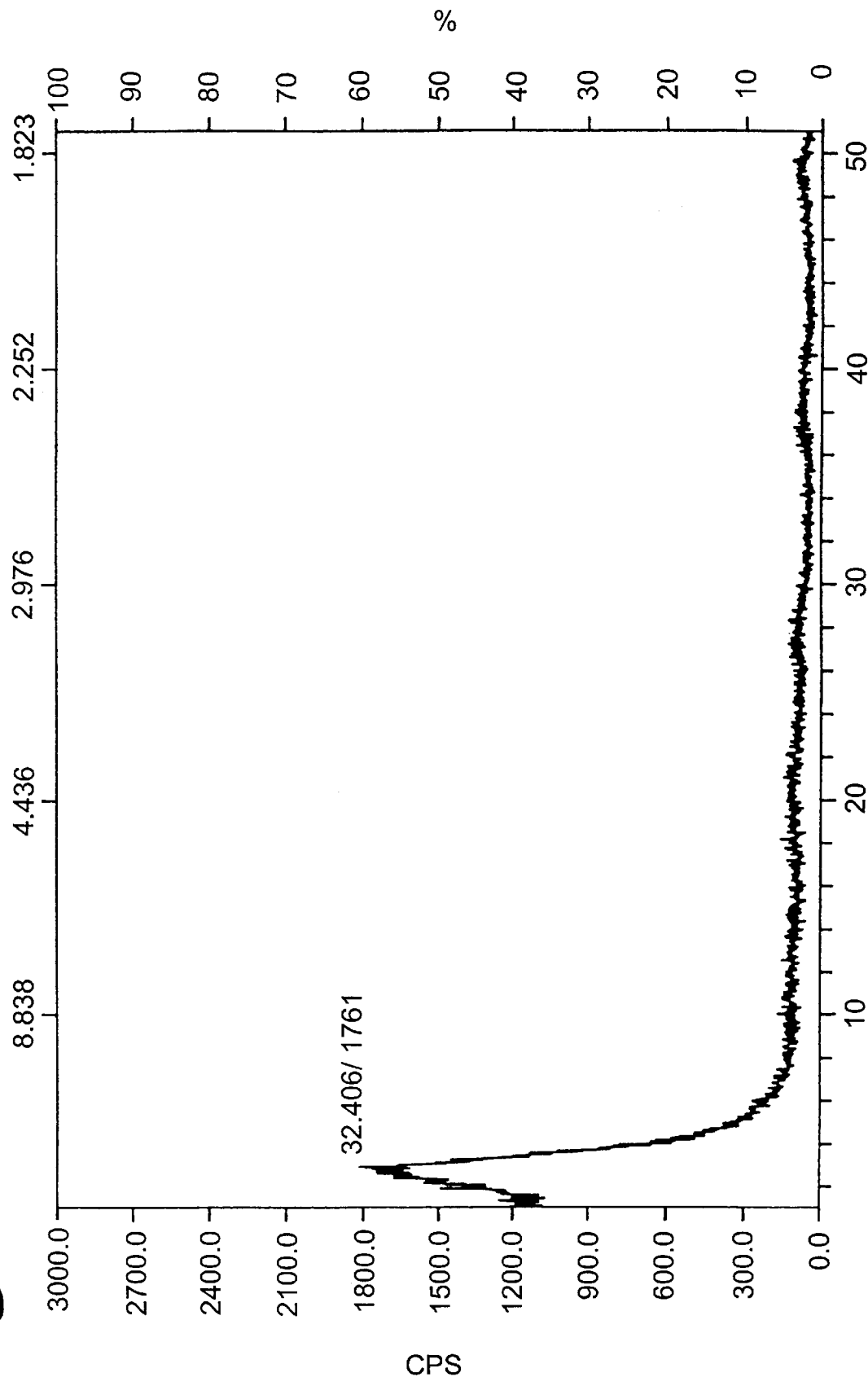

In this Example, 0.29 g of lauric acid was dissolved in 5.87 g of methanol and 3.55 g of deionized water. Then, 1.03 g of aluminum sec-butoxide was added and was hydrolyzed under stirring for fourteen hours before treatment at 355 K for two days. The XRD pattern (FIG. 5-1) exhibited a single line corresponding to a 32-Å d-spacing.

COMPARATIVE EXAMPLE 6

Figures 1, 6:
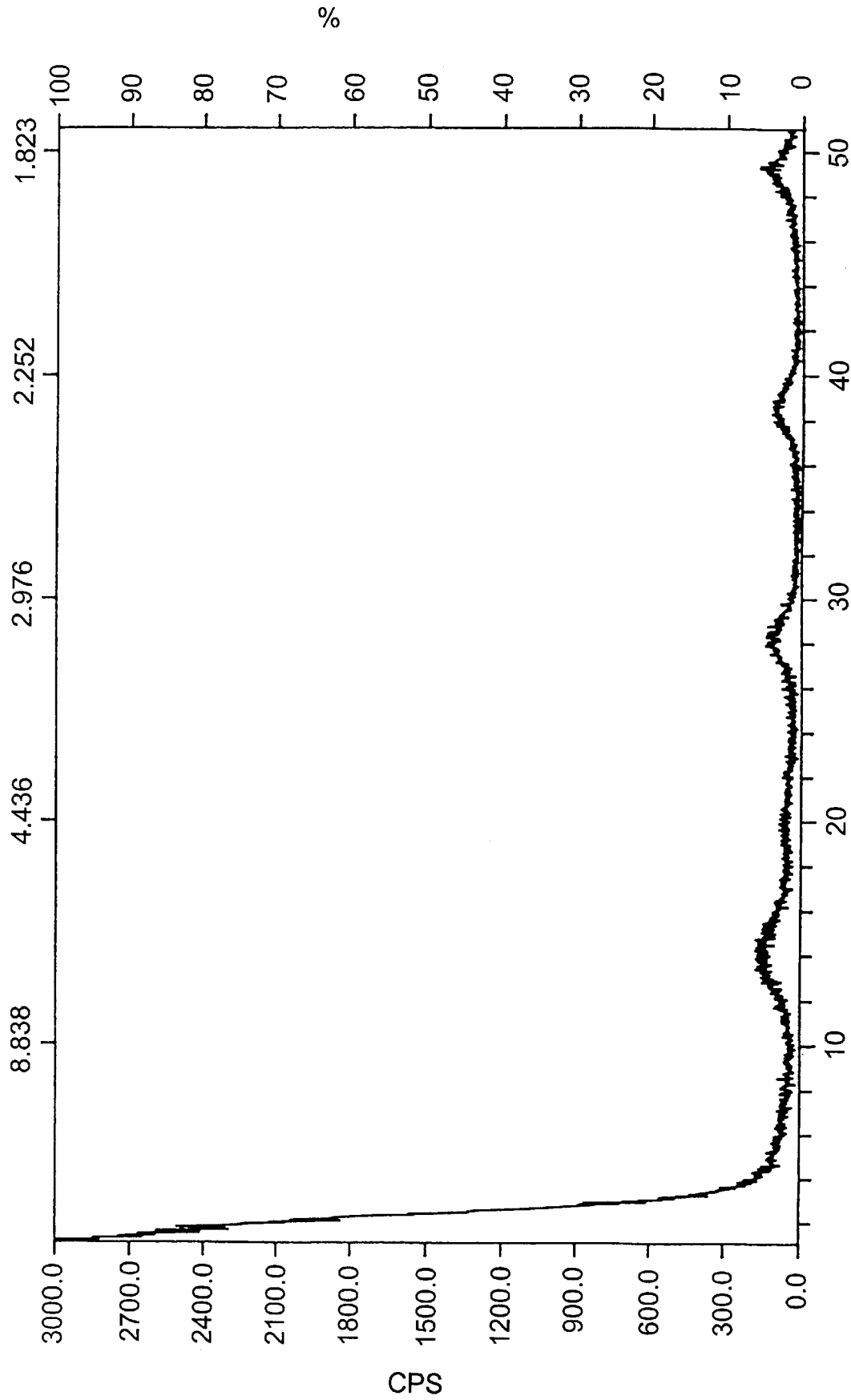

In this Example, which illustrates the unsuccessful results obtained in an all-water synthesis medium, 0.30 g of lauric acid was dissolved in a suspension of aluminum hydroxide obtained after five minutes hydrolysis of 1.0 g aluminum sec-butoxide in 6.85 g of water. The mixture was treated at 383 K for three days. Pseudo-boehmite was obtained (FIG. 6-1).

EXAMPLE 7

Figures 1, 7:
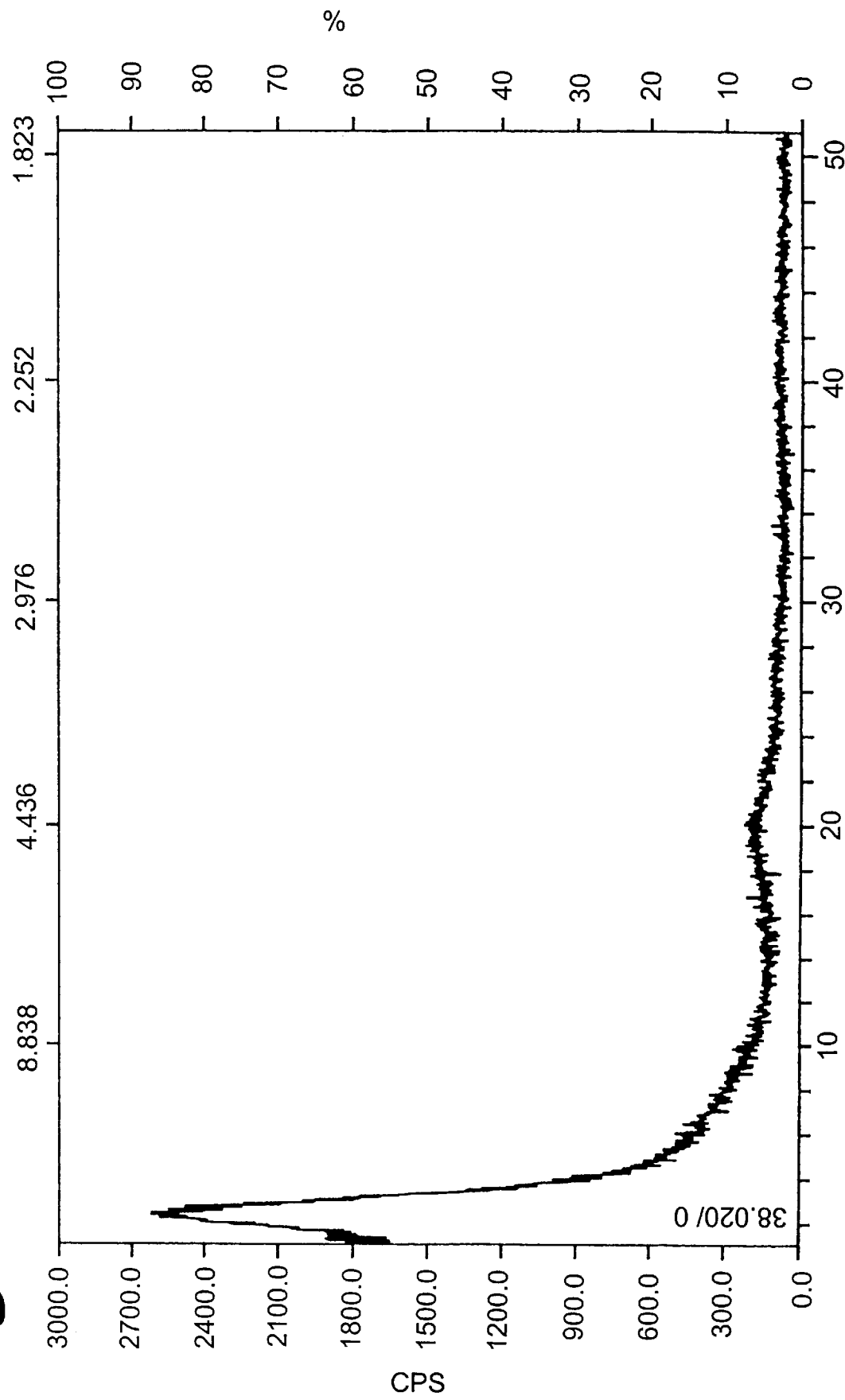
Figure 8:
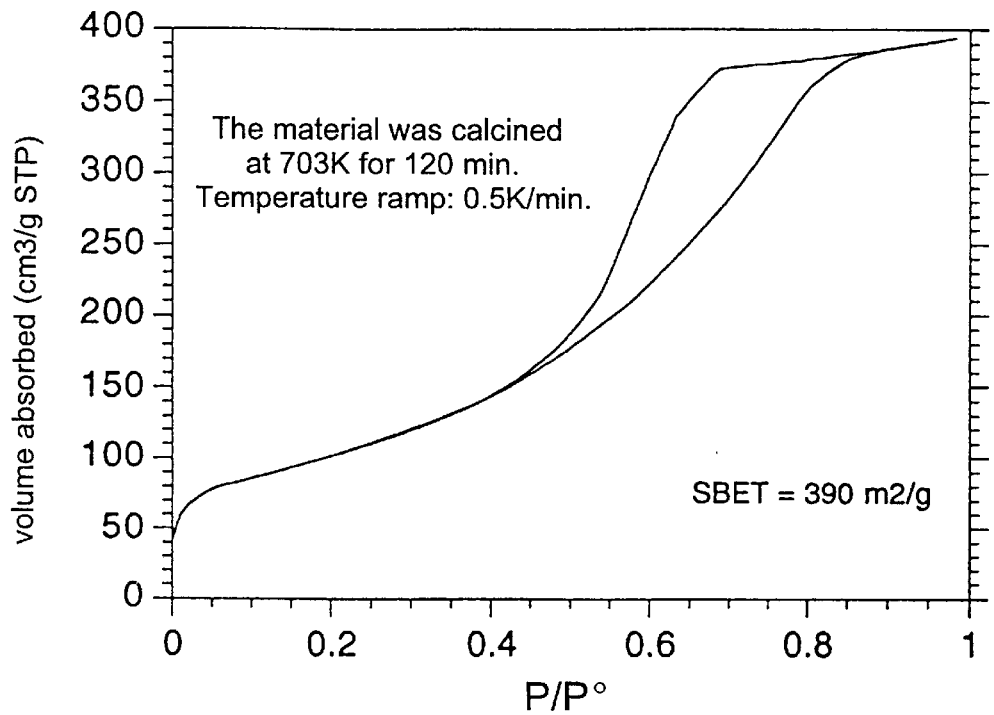
FIG. 8 is the nitrogen absorption isotherm at 77 K for CATAPAL alumina.
Figure 9:
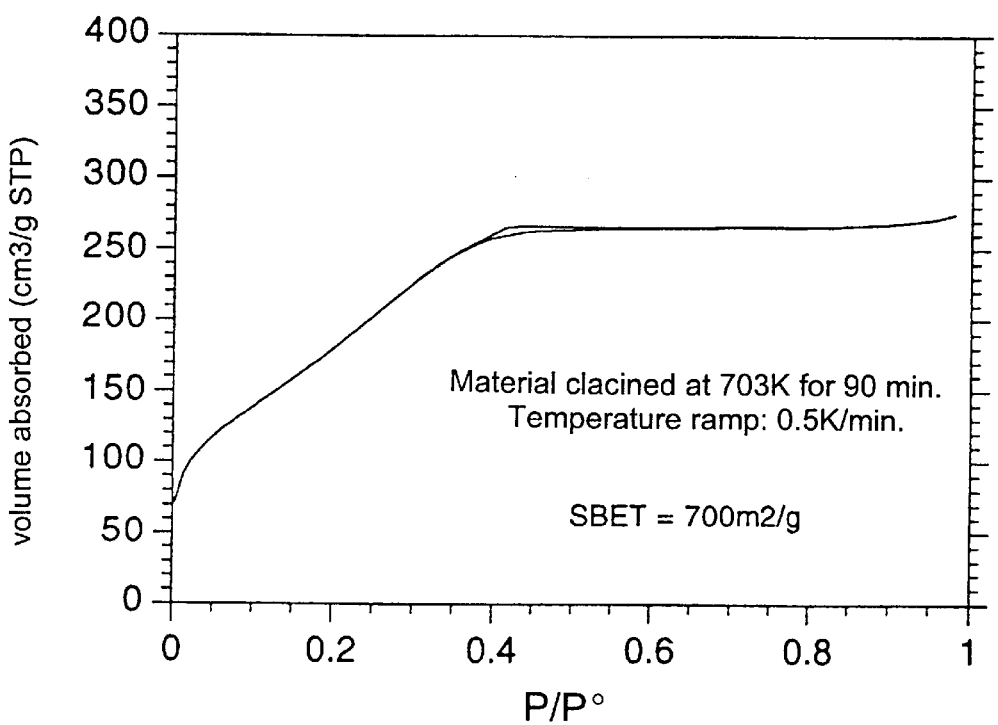
FIG. 9 is the nitrogen absorption isotherm at 77 K for alumina prepared by liquid crystal templating using lauric acid.
Figure 10:
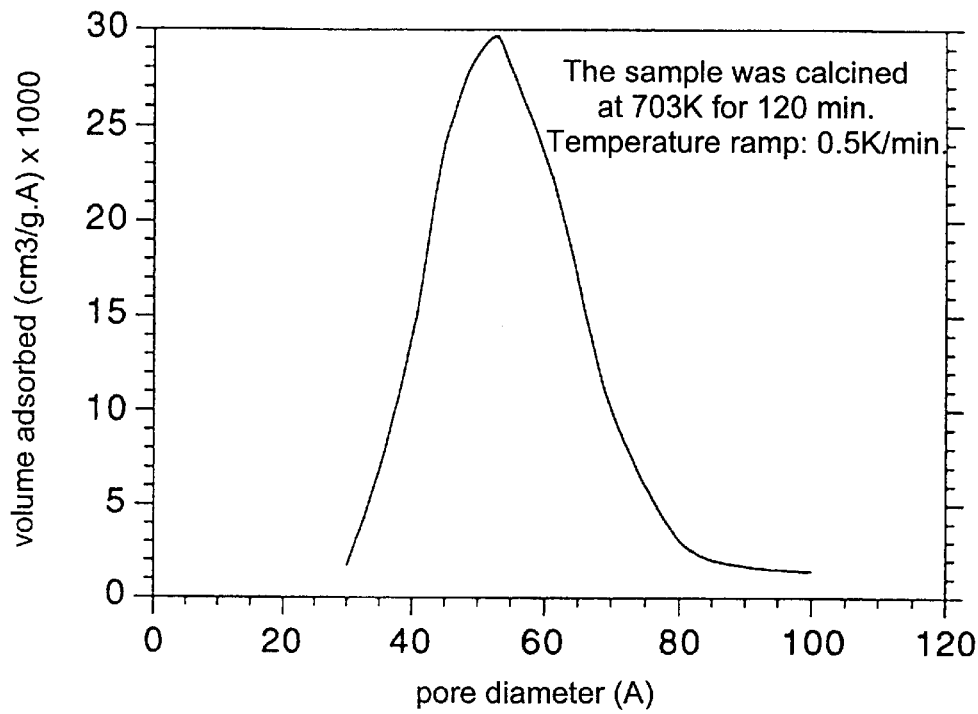
FIG. 10 is the pore-size distribution for Catapal B alumina.
Figure 11:
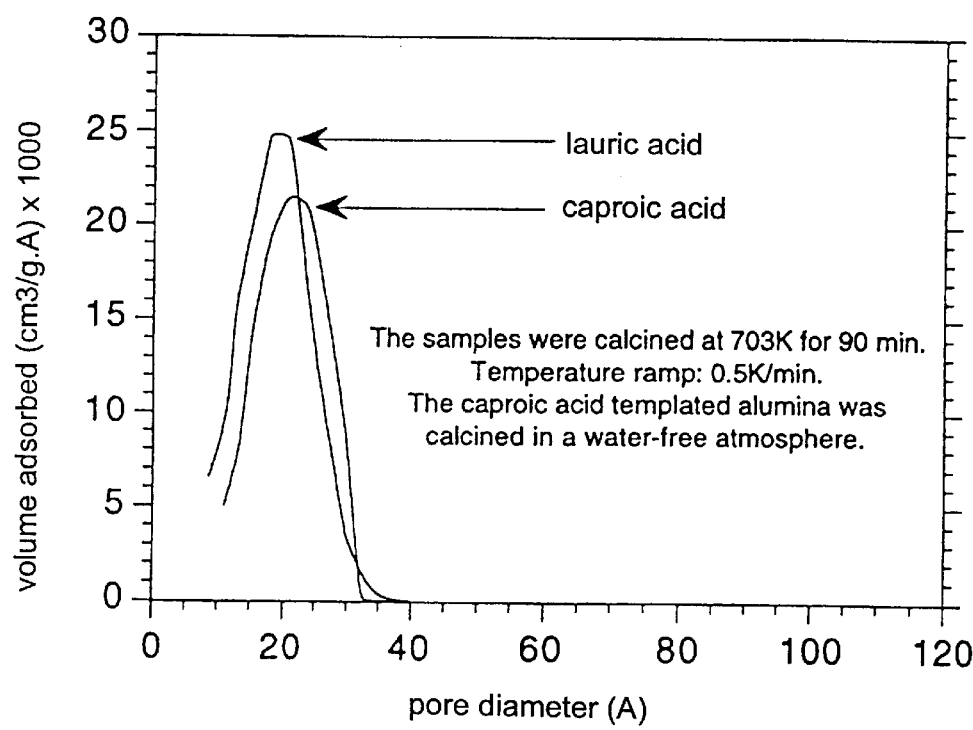
FIG. 11 illustrates the pore-size distributions of aluminas templated by two differing carboxylic acid aggregates.

In this Example, 43.3 g of aluminum sec-butoxide was hydrolyzed with 13.77 g of water in 272.27 g of 1-propanol for three hours. A solution of 9.06 g of lauric acid in 64.4 g of 1-propanol was then added. After sixteen hours of stirring at room temperature, the solid was isolated. The XRD pattern (FIG. 7-1) exhibited a line that corresponded to a 38-Å d-spacing.

Listed in the Tables which follow are further Examples which should serve to illustrate certain aspects of the present invention.

In the portion of Table 1 which follows the carboxylic acid surfactant, the alcohol, the synthesis temperature and time, and the hydrolysis time and aging times that were used are varied as shown:

TABLE 1

This Table illustrates the syntheses of aluminas in an aluminum alkoxide/alcohol/carboxylic acid system. The composition of all synthesis mixtures falls within the following range:
$Al(OR)_3$: 3.2 ± 0.3 $H_2O$: 0.3 ± 0.1 $C_nH_{2n+1}CO_2H$: 25 ± 5 $C_mH_{2m+1}OH$.

| carboxylic acid | alcohol | aluminum alkoxide | hydrolysis time (h) | aging time (h) | synthesis temp. (K.) | synthesis time (d) | alumina obtained | XRD d (Å) |
|---|---|---|---|---|---|---|---|---|
| C12 | C1 | secbutoxide | 0.6 | 14 | 355 | 6 | mesophase | 22[b] |
| C12 | C1 | secbutoxide | 0.6 | 0.1 | 355 | 6 | mesophase | 22[b] |
| C6 | C2 | secbutoxide | 1.3 | 42 | 355 | 3 | mesophase | 28 |
| C8 | C2 | secbutoxide | 1.3 | 42 | 355 | 3 | mesophase | 28 |
| C12 | C2 | secbutoxide | 0.6 | 14 | 355 | 5 | mesophase | 32 |
| C12 | C2 | secbutoxide | 0.8 | 0.2 | 355 | 4 | mesophase | 31 |
| C18 | C2 | isopropoxide | 15 | 25 | 355 | 11 | mesophase | 39 |
| C3 | C3 | secbutoxide | 18 | 18 | 383 | 6 | mesophase | 21 |
| 2,2diMe C4 | C3 | secbutoxide | 10 | 10 | 383 | 6 | mesophase | 23 |
| C5 | C3 | secbutoxide | 18 | 18 | 383 | 6 | mesophase | 20 |
| 2Pr C5 | C3 | secbutoxide | 10 | 10 | 383 | 6 | mesophase | 23 |
| C6 | C3 | secbutoxide | 1.0 | 24 | 383 | 2 | mesophase | 24 |
| 2Me C6 | C3 | secbutoxide | 10 | 10 | 383 | 6 | mesophase | 22 |
| C8 | C3 | secbutoxide | 1.2 | 16 | 383 | 4 | mesophase | 26 |
| neoC10[a] | C3 | secbutoxide | 0.05 | 6 | 383 | 2 | mesophase | 26 |
| C12 | C3 | secbutoxide | 1.0 | 24 | 383 | 2 | mesophase | 29 |
| C12 | C3 | secbutoxide | 1.2 | 0.3 | 383 | 5 | mesophase | 31 |
| C12 | C3 | secbutoxide | 1.0 | 24 | 411 | 2 | mesophase | 30 |
| C12 | C3 | secbutoxide | 0.1 | 0.1 | 411 | 2 | mesophase | 30[c] |
| C12 | C3 | secbutoxide | 1.0 | 24 | 423 | 2 | gel | 30 |
| C18 | C3 | secbutoxide | 1.2 | 16 | 411 | 4 | mesophase | 36 |
| C12 | iC3 | isopropoxide | 5 | 5 | 355 | 2.5 | mesophase | 36 |
| C12 | secC4 | secbutoxide | 8 | 14 | 383 | 2 | mesophase | 33 |
| C12 | secC4 | secbutoxide | 8 | 14 | 423 | 7 | mesophase | / |
| C6 | C6 | secbutoxide | 3 | 17 | 423 | 3.5 | gel | 21 |
| C12 | C6 | secbutoxide | 1.1 | 0.4 | 423 | 4.5 | gel | 25 |
| C18 | C6 | secbutoxide | 3 | 17 | 423 | 3.5 | gel | 28 |
| C18 | C9 | secbutoxide | 2.6 | 16 | 473 | 4 | gel | 34[d] |

[a] mixture of isomers.
[b] low-intensity, broad line. The solvent-to-aluminum ratio was 70 and not 25.
[c] result obtained for syntheses carried out with or without rotation of the reactant vessel.
[d] d-spacing after 12 h drying at 323 K. The d-spacing after uncomplete drying at room temperature for 2 weeks was 39 Å.

In Table 2 which follows certain Examples are provided which illustrate certain calcination performed on materials in which the chain length of the carboxylic acid, for example, was varied.

TABLE 2

| carboxylic acid | alcohol | aluminum alkoxide | calcination conditions | | | position of the XRD line (Å) | | BET surface area (m²/g) |
|---|---|---|---|---|---|---|---|---|
| | | | temp. (°C.) | ramp (°C./min) | time (h) | as-made | calcined | |
| C12 | C2 | secbutoxide | 420 | 0.4 | 2 | 32 | 46 | 480 |
| C5 | C3 | secbutoxide | 420 | 0.5 | 2 | 20 | 52[a] | 280 |
| C6 | C3 | secbutoxide | 420 | 0.5 | 1 | 24 | 54[a] | 530 |
| C12 | C3 | secbutoxide | 420 | 0.5 | 1 | 29 | 46 | 570 |
| C18 | C3 | secbutoxide | 420 | 0.5 | 1 | 37 | 46 | 600 |

Table 2: BET specific surface areas of the various aluminas prepared by the liquid-crystal templating route in alcohols.
([a]): calcined under-water-free air, after heating to the specified temperature under nitrogen.

TABLE 3

| surfactant | solvent | aluminum source | aging[a] time (h) | synthesis temp. (K.) | synthesis time (d) | XRD line: d-spacing (Å) |
|---|---|---|---|---|---|---|
| lauric acid | 2-propanol | acetylacetonate | 16 | 355 | 8 | 30 |
| lauric acid | chloroform | secbutoxide | 15 | 343 | 3.5 | 27 |

TABLE 3-continued

| surfactant | solvent | aluminum source | aging[a] time (h) | synthesis temp. (K.) | synthesis time (d) | XRD line: d-spacing (Å) |
|---|---|---|---|---|---|---|
| lauric acid | ethyl acetate | secbutoxide | 24 | 355 | 1.5 | 41 |
| lauric acid | diethyl ether | secbutoiide | / | 298 | 2.5 | 39 |
| lauric acid | pentane | secbutoiide | / | 298 | 3.5 | 43 |

Table 3: other syntheses of all-alumina mesoporous materials.
[a]The aging time starts when the last reactant is added (water, in stoichiometric amounts).

TABLE 4

| Alumina prepared with: | n-heptane adsorption | | neopentane adsorption | |
|---|---|---|---|---|
| | P/P° | volume (cm³/g) | P/P° | volume (cm³/g) |
| caproic acid | 0.07 | 0.138 | 0.05 | 0.142 |
| lauric acid | 0.03 | 0.089 | 0.04 | 0.104 |
| stearic acid | 0.07 | 0.167 | 0.09 | 0.154 |
| Vista CATAPAL B alumina | 0.05 | 0.090 | 0.05 | 0.039 |

Table 4: low-pressure hydrocarbon adsorption (at 298 K.) on aluminas preparedby nonaqueous liquid crystal templating route and on a commercial alumina. The samples were calcined at 703 K. for ninety minutes (temperature ramp: 0.5 K./min). The sample prepared with caproic acid was calcined under water-free air.

TABLE 5

| alumina sample | average pore size (Å) | full width at half maximum (Å) |
|---|---|---|
| prepared with caproic acid | 21 | 14 |
| prepared with lauric acid | 19 | 14 |
| Vista CATAPAL B alumina | 52 | 25 |

Table 5: pore size characteristics of aluminas based on nitrogen deposition at 77 K. The samples were calcined at 703 K. for ninety minutes (temperature ramp: 0.5 K./min). The sample prepared with caproic acid was calcined under water-free air.

The foregoing Examples illustrate certain embodiments of the present invention but, for that reason, should not be construed in a limiting sense. The scope of protection sought is set forth in the claims which follow.

We claim:

1. A process for forming a mesoporous alumina having an average pore diameter which ranges from about 15 Å to about 40 Å, which comprises treating an aluminum source which is derived from an aluminum alkoxide by reaction with water in organic solvent, in an organic-aqueous solution, with an organic structure directing agent to form meso-sized micelles and hydrothermally treating the resulting composition, and recovering said alumina.

2. A process as claimed in claim 1 wherein the organic structure directing agent is a higher alkyl carboxylic acid containing from about 3 to about 20 carbon atoms in the alkyl group.

3. A process as claimed in claim 1 wherein the organic structure directing agent is a higher alkyl carboxylic acid containing from about 3 to about 20 carbon atoms in the alkyl group and the solution also contains an alcohol cosolvent.

4. A process as claimed in claim 2 wherein the a higher alkyl carboxylic acid contains from about six to about eighteen carbon atoms in its alkyl group.

5. A process as claimed in claim 3 wherein the a higher alkyl carboxylic acid contains from about six to about eighteen carbon atoms in its alkyl group and the alcohol cosolvent contains from about two to nine carbon atoms.

* * * * *